US011416841B2

(12) United States Patent
Miqueo (10) Patent No.: US 11,416,841 B2
(45) Date of Patent: Aug. 16, 2022

(54) DEVICE AND PROCESS FOR PURCHASING ELECTRONIC CONTENT USING MULTIMEDIA MESSAGING SERVICE MESSAGING

(71) Applicant: TracFone Wireless, Inc., Miami, FL (US)

(72) Inventor: Jackie Miqueo, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 317 days.

(21) Appl. No.: 14/803,489

(22) Filed: Jul. 20, 2015

(65) Prior Publication Data

US 2016/0019527 A1 Jan. 21, 2016

Related U.S. Application Data (60) Provisional application No. 62/026,355, filed on Jul. 18, 2014.

(51) Int. Cl.
*G06Q 20/32* (2012.01)
*G06Q 20/40* (2012.01)
*G06Q 20/16* (2012.01)

(52) U.S. Cl.
CPC ......... *G06Q 20/3255* (2013.01); *G06Q 20/16* (2013.01); *G06Q 20/322* (2013.01); *G06Q 20/40* (2013.01)

(58) Field of Classification Search
USPC .................................................. 705/50–79
See application file for complete search history.

(56) References Cited

U.S. PATENT DOCUMENTS

| 5,310,999 A | * | 5/1994 | Claus | ................... G07B 15/063 705/13 |
| 5,768,521 A | * | 6/1998 | Dedrick | .............. H04L 12/1457 709/224 |
| 5,915,226 A | * | 6/1999 | Martineau | ............. H04M 15/47 455/406 |

(Continued)

OTHER PUBLICATIONS

OECD (May 16, 2014), "Consumer Policy Guidance on Mobile and Online Payments", OECD Digital Economy Papers, No. 236, OECD Publishing, Paris, downloaded from http://dx.doi.org/10.1787/5jz432cl1ns7-en and attached as a PDF file. (Year: 2014).*

(Continued)

*Primary Examiner* — James D Nigh
*Assistant Examiner* — Margaret M Neubig (57) ABSTRACT

Using multimedia messaging service ("MMS") messaging to facilitate a transaction for purchasing electronic content on a wireless device is disclosed. Initially, an indication that a user of the wireless device has selected to purchase the electronic content from among a plurality of electronic content available for purchase is received from a wireless device over a wireless network. An MMS message including payment information for the purchase of the selected electronic content is then received from the wireless device. The purchase of the selected electronic content is authorized based on the payment information included in the MMS message and the wireless device is then enabled to download the selected electronic content in response to the authorization of the purchase of the selected electronic content.

20 Claims, 5 Drawing Sheets

(56) References Cited

U.S. PATENT DOCUMENTS

| | | | | |
|---|---|---|---|---|
| 6,788,928 | B2 * | 9/2004 | Kohinata | G06V 40/10 340/5.82 |
| 8,107,921 | B2 * | 1/2012 | Fiatal | H04M 15/51 455/406 |
| 8,774,781 | B1 * | 7/2014 | Speiser | G06Q 20/4012 455/414.3 |
| 2002/0022472 | A1 * | 2/2002 | Watler | H04M 15/30 455/408 |
| 2003/0023427 | A1 * | 1/2003 | Cassin | H04N 21/8456 348/E7.071 |
| 2005/0182926 | A1 * | 8/2005 | Akashika | G07F 7/0886 713/185 |
| 2007/0093233 | A1 * | 4/2007 | Lovell, Jr. | H04M 15/82 455/405 |
| 2008/0109528 | A1 * | 5/2008 | Knight | G06F 8/71 709/217 |
| 2009/0240626 | A1 * | 9/2009 | Hasson | G06Q 20/325 705/17 |
| 2009/0248533 | A1 * | 10/2009 | Colemen | G06Q 40/00 705/26.1 |
| 2009/0265552 | A1 * | 10/2009 | Moshir | H04W 4/12 713/168 |
| 2009/0276318 | A1 * | 11/2009 | Broadbent | G06Q 30/0267 718/1 |
| 2012/0028609 | A1 * | 2/2012 | Hruska | H04W 12/02 455/411 |
| 2012/0066043 | A1 * | 3/2012 | Carmichael | G06Q 30/0207 705/14.23 |
| 2012/0231876 | A1 * | 9/2012 | de Cuba | H04M 15/68 463/25 |
| 2013/0054763 | A1 * | 2/2013 | Van der Merwe | H04W 12/03 709/220 |
| 2016/0335619 | A1 * | 11/2016 | Ce | G06Q 20/327 |

OTHER PUBLICATIONS

"Resolving ten MVNO issues with EPS architecture, VoLTE and advanced policy server", downloaded from https://hal.archives-ouvertes.fr/hal-00766652/document, dated Dec. 18, 2012 (Year: 2012).*

"Resolving ten MVNO issues with EPS architecture, VoLTE and advanced policy server", downloaded from https://hal.archives-ouvertes.fr/hal-00766652/document, dated Dec. 18, 2012; previously attached (Final dated Jan. 4, 2022 (Year: 2012).*

"How To Buy Ringtone And Ringback", dated Jun. 8, 2012, downloaded from https://community.verizon.com/t5/iPhone-4/how-to-buy-ringtone-and-ringback/td-p/343767 (Year: 2012).*

* cited by examiner

DEVICE AND PROCESS FOR PURCHASING ELECTRONIC CONTENT USING MULTIMEDIA MESSAGING SERVICE MESSAGING

CROSS REFERENCE TO PRIOR APPLICATIONS

This application claims the benefit from U.S. Provisional Application No. 62/026,355 filed on Jul. 18, 2014, which is hereby incorporated by reference for all purposes as if fully set forth herein.

TECHNICAL FIELD

The following disclosure generally relates to purchasing electronic content on a wireless device and, more particularly, relates to using multimedia messaging service ("MMS") messaging to facilitate a transaction for purchasing the electronic content on the wireless device.

BACKGROUND

Electronic content, such as music, videos and applications, are typically purchased from content providers on a website or using an application stored on a wireless device. Users can create accounts with the content provider and enter and/or save payment information, such as credit card information, bank account information and/or virtual wallet information, in their accounts. For example, users can enter and/or save a credit card number in the accounts, enter and/or save bank account information in the accounts, deposit a particular unit of credits in the accounts using a prepaid card or link an online payment transfer service to the account for payment of the electronic content. Users can then select electronic content from the webpage or application and choose to pay for the electronic content using their stored payment information.

However, user accounts are being increasingly compromised and users may not want to risk saving their payment information in their accounts. Moreover, such accounts must currently be separately created and maintained for each content provider, which is both time consuming and increases the likelihood of compromise of a user's account.

In addition, some users, such as underage users or users with limited credit histories, may not have access to credit cards or bank accounts and cannot, therefore, utilize such approaches. Such users are unable to purchase electronic content from content providers, thereby both limiting their access to the electronic content and reducing the customer base and potential revenue of the electronic content providers.

Therefore, a new method and system to facilitate a transaction for purchasing electronic content on the wireless device, thereby increasing the security of payment for the electronic content and the accessibility of the electronic content, is needed.

SUMMARY

A method for using MMS messaging to facilitate a transaction for purchasing electronic content on a wireless device is disclosed. Initially, an indication that a user of the wireless device has selected to purchase the electronic content from among a plurality of electronic content available for purchase is received from a wireless device over a wireless network. An MMS message including payment information for the purchase of the selected electronic content is then received from the wireless device. The purchase of the selected electronic content is authorized based on the payment information included in the MMS message and the wireless device is then enabled to download the selected electronic content in response to the authorization of the purchase of the selected electronic content.

In some aspects, information regarding the plurality of electronic content available for purchase can be forwarded to the wireless device from an electronic content server. The MMS message can be encrypted and then decrypted to extract the payment information for the purchase of the selected electronic content.

In some aspects, the payment information can include a current account balance of the user of the wireless device and the authorizing of the purchase of the selected electronic content can include determining that the current account balance is greater than a purchase price of the selected electronic content.

In some aspects, the payment information can include an identifier of an account associated with the user of the wireless device and the authorizing of the purchase of the selected electronic content can include determining that the user of the wireless device is permitted to purchase the selected electronic content.

In some aspects, the wireless device can be enabled to download the selected electronic content by forwarding a multimedia messaging service message including authorization information to the wireless device. An electronic content server can be enabled to forward the selected electronic content to the wireless device over the wireless network. The selected electronic content can be forwarded to the wireless device.

A system including at least one processor connected to at least one memory for purchasing electronic content for a wireless device is also disclosed. The at least one processor is configured to receive an indication that a user of the wireless device has selected to purchase electronic content from among a plurality of electronic content available for purchase from a wireless device over a wireless network. Next, the at least one processor is configured to receive an MMS message including payment information for the purchase of the selected electronic content from the wireless device. The at least one processor is then configured to authorize the purchase of the selected electronic content based on the payment information included in the MMS message. Next, the at least one processor is configured to enable the wireless device to download the selected electronic content in response to the authorization of the purchase of the selected electronic content.

Another method for using MMS messaging to facilitate a transaction for purchasing electronic content on a wireless device is also disclosed. Initially, information regarding a plurality of electronic content available for purchase is received at the wireless device and from an electronic content server over a wireless network. An indication that a user of the wireless device has selected to purchase electronic content from among the plurality of electronic content available for purchase is then forwarded from the wireless device. Next, an MMS message including payment information for the purchase of the selected electronic content is forwarded from the wireless device. Finally, the selected electronic content is downloaded in response to authorization of the payment information.

In some aspects, the MMS message can be forwarded to an authorization server that is different from the electronic content server. The MMS message can be encrypted. An MMS message including authorization information can be received.

In some aspects, the payment information can include the current account balance of the user of the wireless device and the authorization of the payment information can include a determination that the current account balance is greater than a purchase price of the selected electronic content.

In some aspects, the payment information can include an identifier of an account associated with the user of the wireless device and the authorization of the payment information can include a determination that the user of the wireless device is permitted to purchase the selected electronic content.

Details of one or more aspects of using MMS messaging to facilitate a transaction for purchasing electronic content on a wireless device are set forth in the accompanying drawings and the description below. Other aspects of using MMS messaging to facilitate a transaction for purchasing electronic content on a wireless device will be apparent from the description and drawings, and from the claims.

DESCRIPTION OF DRAWINGS

Like reference symbols indicate like elements throughout the specification and drawings.

DETAILED DESCRIPTION

Figure 1:
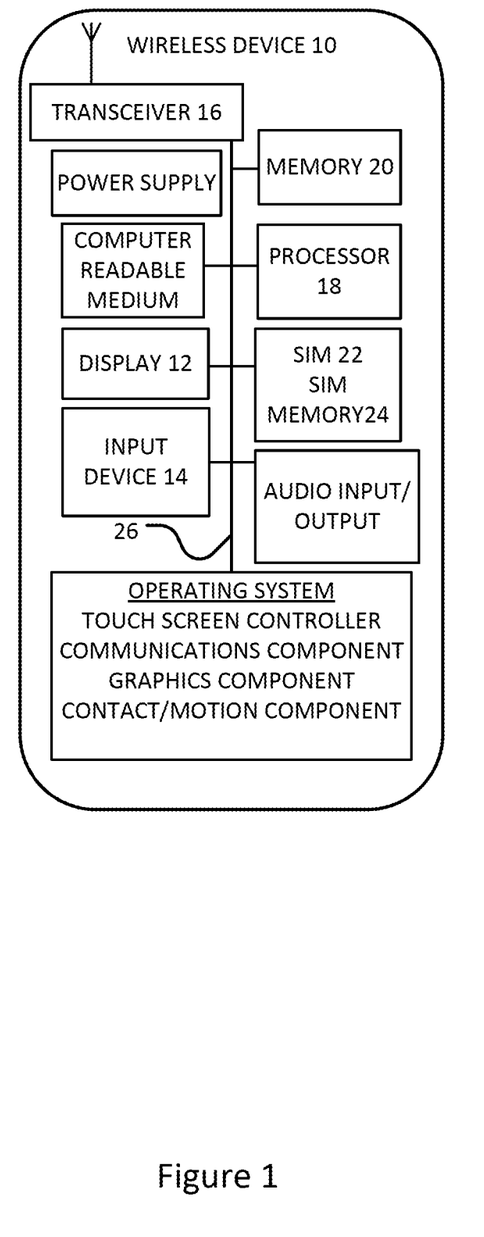
FIG. 1 illustrates a block diagram of an exemplary wireless device according to aspects of the disclosure.

FIG. 1 illustrates a block diagram of an exemplary wireless device 10 according to aspects of the disclosure. The wireless device 10 can be any mobile technology computing device that connects to a wireless communication network such as, for example, a mobile phone, a wireless handset, a wireless dongle, user equipment, a mobile station, or the like. The wireless device 10 includes a display 12, an input device 14, a transceiver 16, a processor 18, a memory 20, and may include a Universal Integrated Circuit Card ("UICC") or Subscriber Identification Module ("SIM") card 22. In some implementations, the SIM card 22 can be removably received within a card slot (not shown) in the wireless device 10 and can include internal SIM memory 24. The SIM card 22 can store information such as an International Mobile Subscriber Identity ("IMSI"), a key used to identify and authenticate subscribers using the wireless device 10, or the like. The SIM card 22 can be configured to be transferred between different wireless devices 10. In other aspects, the wireless device 10 operates without a UICC or SIM card 22.

The processor 18 is capable of processing instructions for execution within the wireless device 10. For example, the processor 18 can process instructions stored in the memory 20 to display graphical information on the display 12 and/or to transmit or receive data using the transceiver 16. The processor 18 can be a single-threaded processor, a multi-threaded processor, or the like. The memory 20 can include, for example, volatile or non-volatile random access memory ("RAM") and/or read only memory ("ROM"). The components 12, 14, 16, 18, and 20 within the wireless device 10 may communicate through an internal bus 26.

Figure 2:
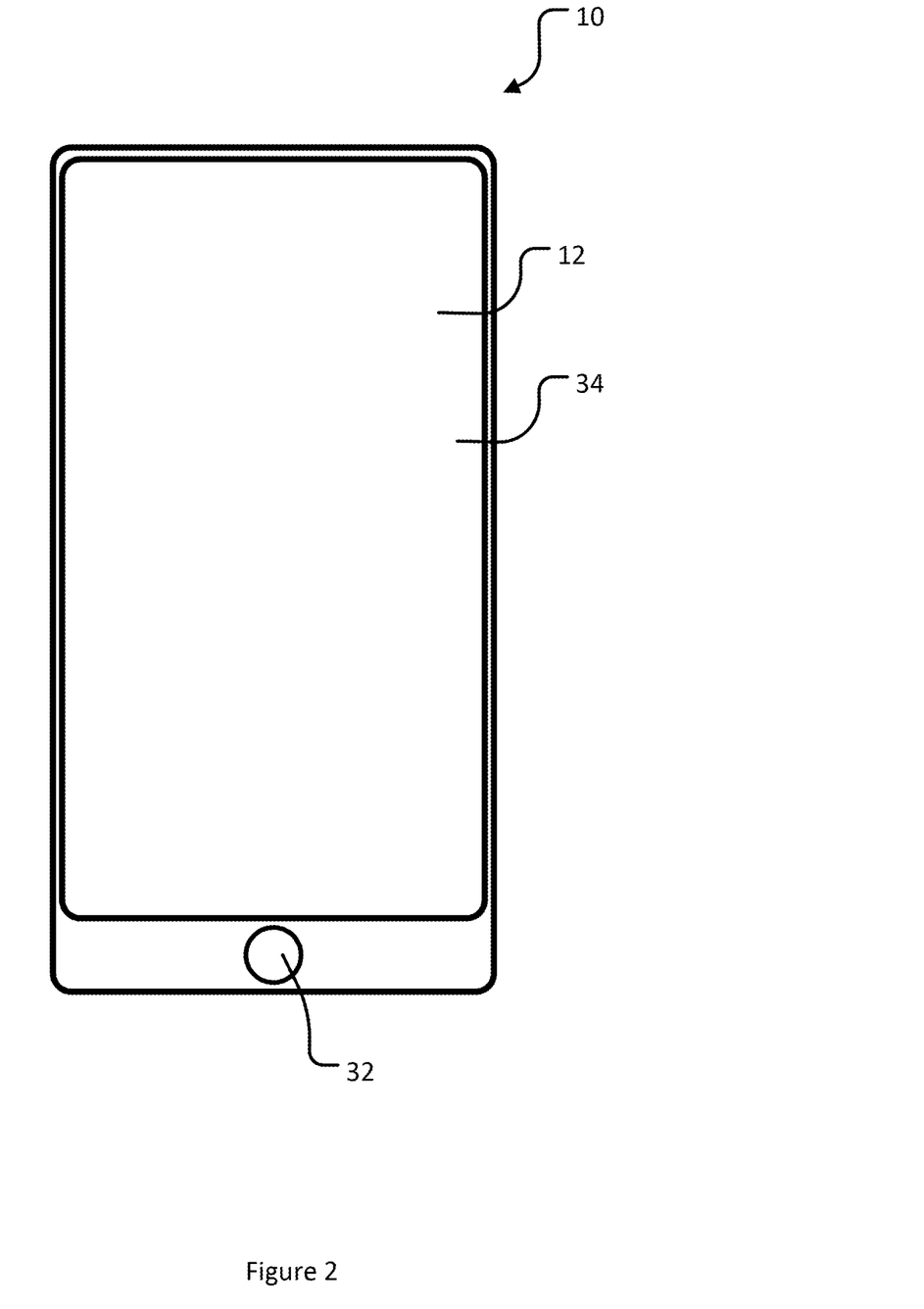
FIG. 2 illustrates an exemplary wireless device according to aspects of the disclosure.

FIG. 2 illustrates an exemplary wireless device 10 according to aspects of the disclosure. The wireless device 10 may include a display 12 that is a screen that can be touch sensitive. The input device 14 can include one or more of a keypad, a trackball, selectable buttons 32, a touch screen 34 having selectable regions, or the like. In some aspects, the touch screen 34 may replace the one or more of the keypad, trackball, and selectable buttons 32. The wireless device 10 may also include an antenna (not shown) coupled to the transceiver 16 to facilitate the transmission and receipt of communications by the wireless device 10.

Figure 3:
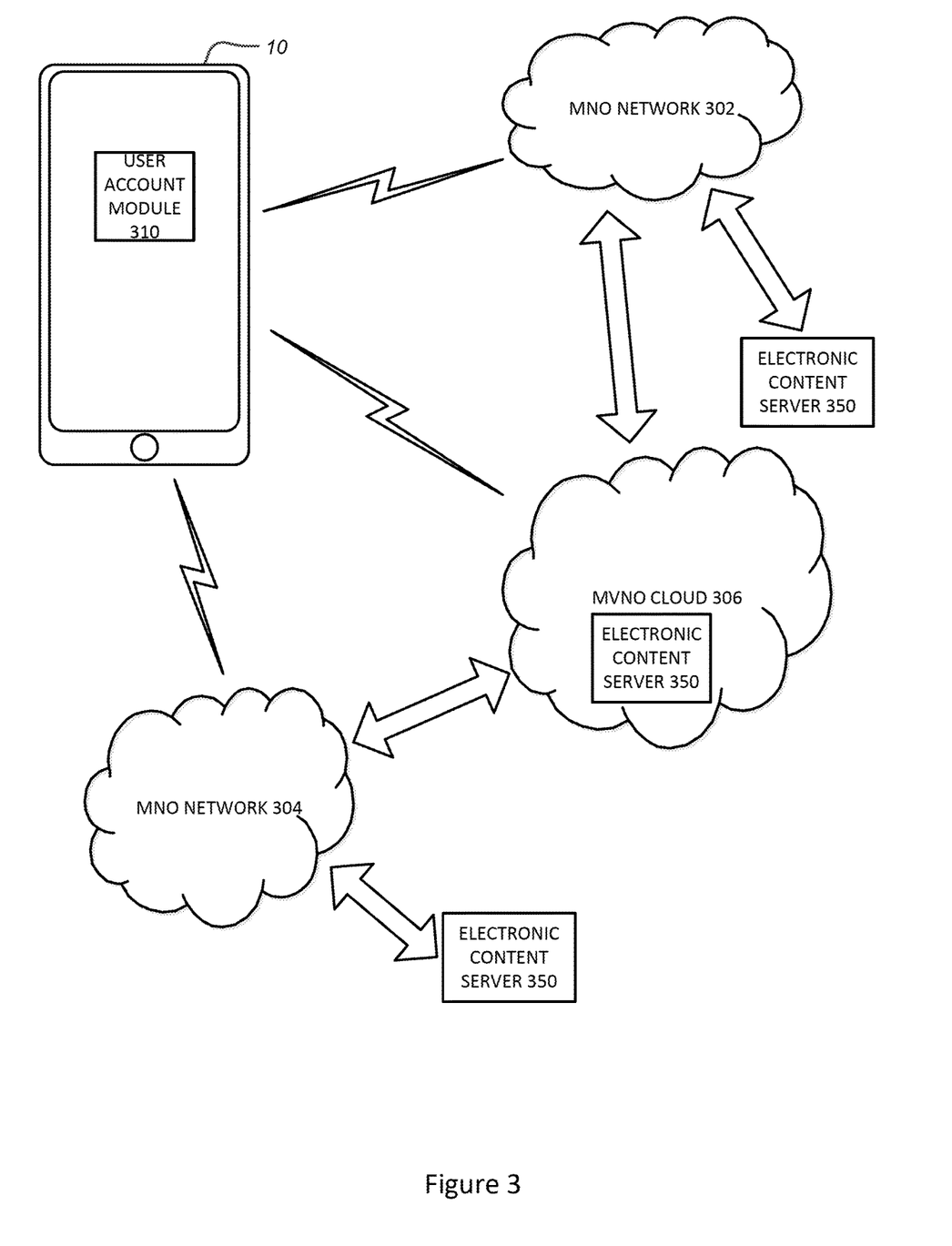
FIG. 3 illustrates a schematic diagram showing the connectivity between a wireless device, a plurality of mobile network operators, and a mobile virtual network operator according to aspects of the disclosure.

FIG. 3 illustrates a schematic diagram showing the connectivity between a wireless device 10, a plurality of mobile network operators ("MNO") networks 302 and 304, and a mobile virtual network operator ("MVNO") cloud 306 according to aspects of the disclosure. In some aspects, the MVNO cloud 306 may be optional. Although two MNO networks 302 and 304 are illustrated in FIG. 3, any number of MNO networks can be available. The wireless device 10 may connect to one of the MNO networks 302 and 304 depending on the geographic location of the wireless device 10, the availability of the MNO networks 302 and 304, and/or the service contract associated with the wireless device 10. The MNO networks 302 and 304 can be any type of wireless network utilizing a communications channel, such as a cellular data network, e.g., a Global System for Mobile Communication ("GSM") network, a Code-Division Multiple Access ("CDMA") network, an Universal Mobile Telecommunications System ("UMTS") network, an Evolution-Data Optimized ("EV-DO") network, a Long Term Evolution ("LTE") network, a wireless local network, a wide area network, and/or the like.

The MNO networks 302 and 304 can connect the wireless device 10 to an electronic content server 350 that can identify and/or forward electronic content available for purchase. In some aspects, the electronic content server 350 can be a server of a publisher of electronic content, such as a content publisher and/or distributer. In other aspects, the electronic content server 350 can be a server of an electronic content distribution platform that consolidates electronic content from a variety of publishers of electronic content. The electronic content server 350 can forward information regarding a plurality of electronic content available for purchase to the wireless device 10, receive an indication that a user of the wireless device 10 has selected to purchase one or more electronic content from among the plurality of the electronic content available for purchase, and/or forward the selected electronic content to the wireless device 10.

In some aspects, a wireless subscriber purchases a wireless communications plan from an MVNO. The MVNO is a wireless operator that typically does not own its own frequency spectrum or have its own network infrastructure. Instead, MVNOs contract for the right to access a wireless communications network owned by a MNO and sell that access to their wireless subscribers. Therefore, to provide activation, metering, additional services, and other customer services to their subscribers, MVNOs operate systems, such as the MVNO cloud 306, that communicate with the MNO networks 302 and 304.

The MVNO cloud 306 may communicate with the MNO networks 302 and 304 to receive information about and from the wireless device 10 on the MNO networks 302 and 304. The MVNO cloud 306 can be one or more of dedicated hardware, application specific integrated circuits, programmable logic arrays, computers, and servers including one or more processors and one or more memories.

In some aspects, the electronic content server 350 can be included as part of the MVNO cloud 306. In such aspects, the MVNO cloud 306 including the electronic content server 350 can identify and/or forward electronic content available for purchase.

A user account module 310 may be included in the wireless device 10 and may be pre-installed or post-installed on the wireless device 10. The user account module 310 may be stored or executed on, for example, the memory 20, the UICC/SIM memory 24, dedicated hardware, application specific integrated circuits, programmable logic arrays, the MVNO cloud 306, the processor 18 of the wireless device 10 and/or the like.

User account information may be stored in the user account module 310 and/or outside of the user account module 310. In some aspects where the user account information is stored in the wireless device 10, the user account information may be stored in, for example, the memory 20, in an application stored in the memory 20, and/or the SIM memory 24 of the wireless device 10. In other aspects where the user account information is stored outside of the wireless device 10, the user account information may be stored in the MVNO cloud 306, in the MNO Network 302 or 304, in a non-transitory memory accessible to the wireless device 10 and/or the like.

The user account information may contain an identifier of the user of the wireless device 10, a current account balance of the user of the wireless device 10, payment information of the user of the wireless device 10, payment preferences of the user of the wireless device 10, contact information of the user of the wireless device 10, or the like. The payment information of the user of the wireless device 10 can include credit card information, bank account information, virtual wallet information, or the like. The current account balance of the user of the wireless device 10 may be an account balance of the user of the wireless device 10 with the MVNO. The account balance may be used for wireless services, such as voice communications, messaging, and/or data usage, as well as other purchases, such as purchases of electronic content. As such, a wireless subscriber of services from the MVNO can use his/her account balance with the MVNO to purchase electronic content from, for example, a third party electronic content provider. The account balance may be monitored and determined consistent with U.S. Pat. No. 6,650,887, to McGregor, et al., filed Nov. 18, 2003 and incorporated by reference herein in its entirety and/or U.S. patent application Ser. No. 13/669,838, filed Nov. 6, 2012 and incorporated by reference herein in its entirety.

The user account module 310 may be used to facilitate purchase of selected electronic content on a wireless device 10 from an electronic content server 350 included in the MVNO cloud 306 and/or accessible through the MNO Network 302 or 304. The user account module 310 may transmit user account information and/or payment information to an electronic content server 350 and/or to the MVNO cloud 306, from which the wireless device 10 may purchase and download selected electronic content.

The user account module 310 may transmit user account information and/or payment information to an electronic content server 350 and/or to the MVNO cloud 306 without user interaction or augmentation following selection of electronic content of interest by the user. After authorization of the purchase of the selected electronic content, the wireless device 10 can be enabled to download the selected electronic content and/or then download the selected electronic content. The wireless device 10 can be enabled to download the selected electronic content and/or then download the selected electronic content without user interaction or augmentation.

Figure 4:
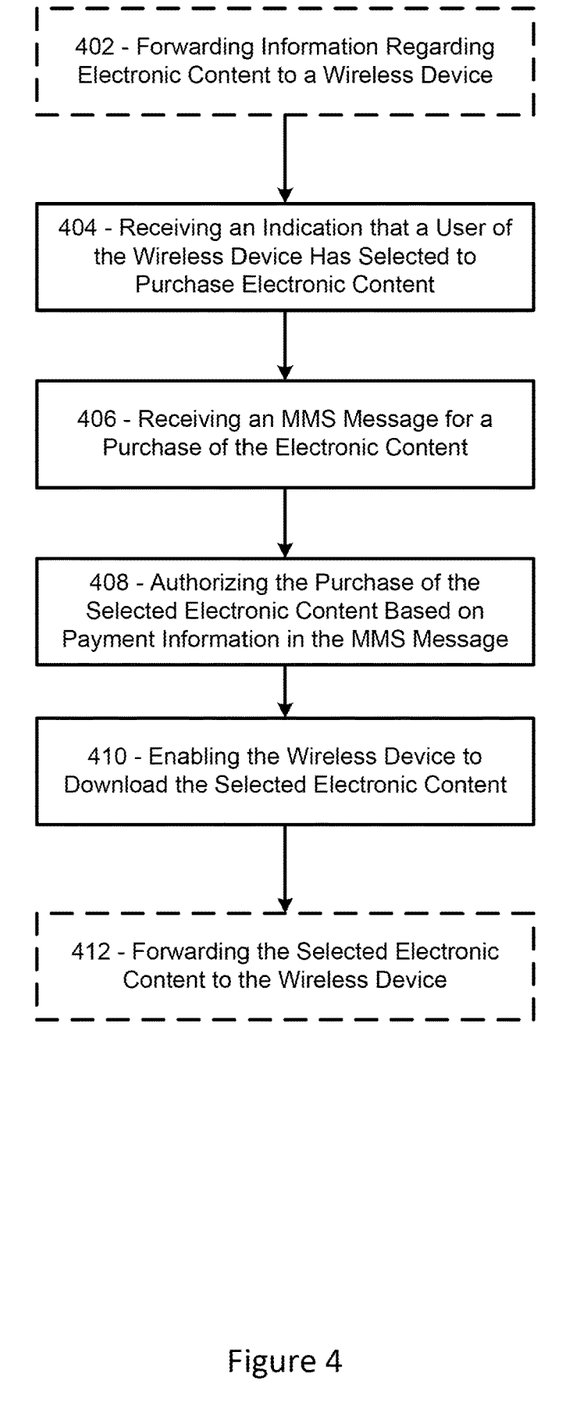
FIG. 4 illustrates a flowchart showing an exemplary process for a server communicating with a wireless device to use MMS messaging to facilitate a transaction for purchasing electronic content on the wireless device according to aspects of the disclosure.

FIG. 4 illustrates a flowchart showing an exemplary process 400 for a server communicating with the wireless device 10 to use MMS messaging to facilitate a transaction for purchasing electronic content on the wireless device 10 according to aspects of the disclosure. One or more steps of the process 400 can be carried out by, for example, an electronic system such as the wireless device 10, the MNO Network 302 or 304, the MVNO cloud 306 and/or the electronic content server 350.

Initially, the electronic content server 350 and/or the MVNO cloud 306 may optionally forward information regarding a plurality of electronic content available for purchase to the wireless device 10 (step 402). The information regarding the plurality of electronic content available for purchase can be displayed in a web browser of the wireless device 10 and/or can be displayed in an application that is stored on the wireless device 10. The information regarding the plurality of electronic content available for purchase can include a title, a description, ratings, a price, or the like, of the electronic content available for purchase. The information regarding the plurality of electronic content available for purchase can be organized by type of electronic content, by price, by rating, by publisher, or the like.

In some aspects, the information regarding the plurality of electronic content available for purchase can be forwarded in response to a request, such as a search string, from the user of the wireless device 10. For example, the user of the wireless device 10 can search for all songs by a particular band and the electronic content server 350, the MVNO cloud 306 can forward information regarding all of the songs of that particular band to the wireless device 10 and/or the like. In another example, information regarding the plurality of electronic content available for purchase can be forwarded based on predictions of the user's interests and/or past activity. For example, if the user of the wireless device 10 has purchased many rock and roll songs, information regarding other electronic content related to rock and roll can be forwarded to the wireless device 10. For example, information regarding an application popular among rock and roll fans can be forwarded to the wireless device 10.

In some aspects, the electronic content available for purchase can include one or more of music, music videos, movies, television shows, documentaries, electronic books, audiobooks, magazines, games, applications, and/or the like. In some aspects, two or more of the electronic content can be linked. For example, electronic books and audiobooks can be linked, such that if the user of the wireless device 10 selects an electronic book for purchase, the user will receive a suggestion to also purchase the audiobook corresponding to the electronic book.

The user of the wireless device 10 can browse through the information regarding the plurality of electronic content available for purchase to select one or more electronic content for purchase. Following selection of the one or more electronic content, the electronic content server 350 or the MVNO cloud 306 receives an indication from the wireless device 10 that the user of the wireless device 10 has selected to purchase electronic content (step 404).

In some aspects, the indication may include an identifier of the selected electronic content, an identifier of the user of the wireless device 10 from the user account module 310, a date and time that the user of the wireless device 10 selected the electronic content, or the like. The identifier of the user of the wireless device 10 can be a username of the user, an account number of the user with the MVNO, an account number of the user with the electronic content server 350, biometric information of the user of the wireless device 10, and/or the like. The identifier of the wireless device 10 can be an Internet Protocol ("IP") address of the wireless device 10 at the time of selection of the electronic content, a media access control ("MAC") address of the wireless device 10, location coordinates of the wireless device 10 at the time of selection of the electronic content, and/or the like. The electronic content server 350 or MVNO cloud 306 can identify the user of the wireless device 10, the wireless device 10, and/or the selected electronic content based on the information included in the indication received from the wireless device 10.

In order to make payment for the selected electronic content, an MMS message including payment information can be received from the wireless device 10 at the electronic content server 350 and/or the MVNO cloud 306 (step 406). In some aspects, the user of the wireless device 10 may not have payment information stored at the electronic content server 350 and/or the MVNO cloud 306 to purchase the selected electronic content. However, the user of the wireless device may have a positive account balance in the user account module 310 of the wireless device 10. In such aspects, the electronic content server 350 and/or the MVNO cloud 306 may receive payment for the selected electronic content from the available balance of the user in the user account module 310 based on the payment information included in the MMS message. In such aspects, the payment information received in the MMS message can be, for example, the current available balance of the user or an indication that the purchase price of the selected electronic content has been subtracted from the balance of the user.

In some aspects, the user account including the current available balance of the user of the wireless device 10 can be stored on the electronic content server 350 and/or the MVNO cloud 306. In such aspects, the payment information received in the MMS message can be an identifier of the MVNO account associated with the user of the wireless device 10.

In some aspects, no payment information for the user can be stored in the user account module 310 of the wireless device 10, in the electronic content server 350, and/or in the MVNO cloud 306. In such aspects, the payment information received in the MMS message can be an identifier of an account associated with the user of the wireless device 10, such as a credit card number, a bank account number, a username of a virtual wallet, a username of an online payment transfer service, and/or the like. The electronic content server 350 and/or the MVNO cloud 306 can then receive payment for the selected electronic content from the account associated with the user of the wireless device 10 based on the identifier of the account included in the MMS message.

In some aspects, the MMS message may be encrypted to protect the payment information. The MMS message may be encrypted according to symmetric-key encryption where the encryption and decryption keys are the same and/or public-key encryption where the encryption and decryption keys are different. The encryption key can be stored in the wireless device 10 and the decryption key can be stored in the electronic content server 350 and/or the MVNO cloud 306. Other encryption protocols are contemplated as well. In aspects where the MMS message is encrypted, the MMS message can be decrypted by the electronic content server 350 and/or the MVNO cloud 306 in order to extract the payment information.

In some aspects, a Short Messaging Service ("SMS") message including the payment information can be received in place of the MMS message. However, because SMS messages are limited to 140 octets or 1,120 bits, SMS messages typically cannot be encrypted. MMS messages, however, are limited to 300 KB or more and can, therefore, be encrypted to secure the payment information.

The electronic content server 350 and/or the MVNO cloud 306 can then authorize the purchase of the selected electronic content based on the payment information included in the MMS message (step 408). If the MMS message is encrypted, the MMS message can be decrypted to extract the payment information before the purchase of the selected electronic content is authorized. In some aspects, the purchase of the selected electronic content can be authorized by determining that the current account balance of the user of the wireless device 10 is greater than the purchase price of the selected electronic content.

In still further aspects, the purchase of the selected electronic content can be authorized by receiving an indication that the purchase price of the selected electronic content has been subtracted from the account balance of the user in the user account module 310 of the wireless device 10. In some aspects, the purchase of the selected electronic content can be authorized by the electronic content server 350 and/or the MVNO cloud 306 subtracting the purchase price of the selected electronic content from a user account stored on the electronic content server 350 and/or the MVNO cloud 306 identified by the identifier of the user account included in the received MMS message.

In yet further aspects, the purchase of the selected electronic content can be authorized by charging the purchase price of the selected electronic content from an account associated with the user of the wireless device 10 based on an identifier of the account included in the received MMS message.

In some aspects, the purchase of the selected electronic content can be authorized by forwarding a purchase confirmation message, such as another MMS message, to the wireless device 10 that requires the user of the wireless device 10 to confirm that he/she has selected to purchase the electronic content. The purchase confirmation message may include user account information and/or payment information so that the user can know the remaining balance in his/her account before and/or after the purchase of the selected electronic content.

In some aspects, if the account does not include sufficient funds for the purchase of the selected electronic content or if the balance of the account following purchase of the selected electronic content will be below a predetermined threshold, the purchase confirmation message and/or another message may include an option for the user of the wireless device 10 to add funds to the account. The funds can be added to the account of the user of the wireless device 10 stored on the user account module 310 from a promotional item, a calling card, a website, another account associated with the user, and/or the like.

In some aspects, to authorize the purchase, the electronic content server 350 and/or the MVNO cloud 306 can determine whether the user of the wireless device 10 or the wireless device 10 itself is permitted to purchase the selected electronic content. There may be restrictions on some electronic content, in which case the authorization of the purchase of the selected electronic content may include comparing characteristics of the user of the wireless device 10 or of the wireless device 10 itself with the restrictions associated with the selected electronic content to ensure that the user of the wireless device 10 is permitted to purchase the selected electronic content. The restrictions on the electronic content can include age restrictions, type of electronic content restrictions, geographic restrictions, price restrictions, and/or the like. For example, a user may have to be above 18 years old to purchase the selected electronic content or the wireless device 10 may have to be located within the United States to purchase the selected electronic content.

In response to authorization of the purchase of the selected electronic content, the wireless device 10 can be enabled to download the selected electronic content (step 410). In some aspects, the wireless device 10 can be enabled to download the selected electronic content by forwarding an MMS message including authorization information from the electronic content server 350 and/or the MVNO cloud 306 to the wireless device 10. The authorization information can include an authorization code, an indication of a payment confirmation, a summary of the purchase of the selected electronic content, the amount of money subtracted from the user's account, the remaining balance of the user's account, or the like. The wireless device 10 may then forward the authorization information to the electronic content server 350 to confirm purchase of the selected electronic content.

In further aspects, the wireless device 10 can be enabled to download the selected electronic content by sending the authorization information, such as the authorization code, to the wireless device 10 by data transmission and not in an MMS message.

In other aspects where the electronic content server 350 is not included in the MVNO cloud 306, the wireless device 10 can be enabled to download the selected electronic content by the electronic content server 350 forwarding the authorization information directly to the MVNO cloud 306 without the wireless device 10 as an intermediary.

In yet further aspects, the wireless device 10 can be enabled to download the selected electronic content by forwarding an indication that the selected wireless content is available for download from the electronic content server 350 and/or the MVNO cloud 306. The indication that the selected wireless content is available for download can be forwarded in an MMS message or as data.

Once the wireless device 10 is enabled to download the selected electronic content, the electronic content server 350 and/or the MVNO cloud 306 may forward the selected electronic content to the wireless device 10 (step 412). The selected electronic content can be forwarded to the wireless device 10 immediately after the wireless device 10 has been enabled to download the selected electronic content, or at a later time initiated by the user of the wireless device 10. For example, the user of the wireless device 10 may wait until the wireless device 10 is connected to a local area network rather than the MNO Network 302 or 304 before initiating download of the selected electronic content.

Figure 5:
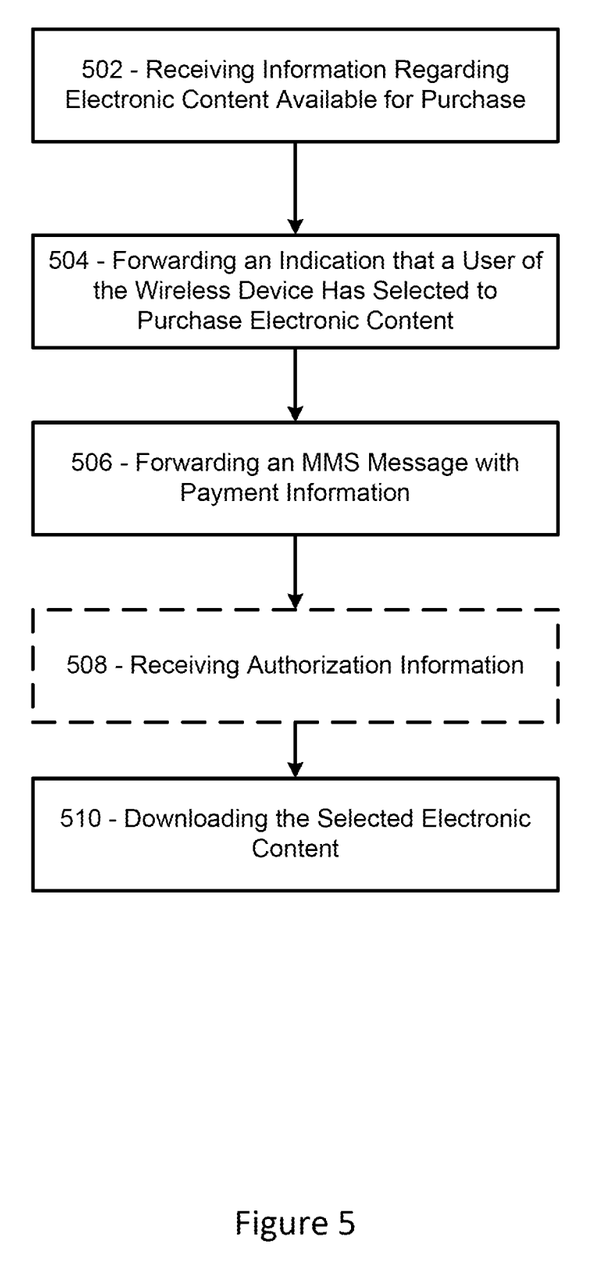
FIG. 5 illustrates a flowchart showing an exemplary process for a wireless device communicating with a server to use MMS messaging to facilitate a transaction for purchasing electronic content according to aspects of the disclosure.

FIG. 5 illustrates a flowchart showing an exemplary process 500 for the wireless device 10 communicating with a server to use MMS messaging to facilitate a transaction for purchasing electronic content according to aspects of the disclosure. One or more steps of the process 500 can be carried out by, for example, an electronic system such as the wireless device 10, the MNO Network 302 or 304, the MVNO cloud 306 and/or the electronic content server 350.

Initially, the wireless device 10 can receive information regarding a plurality of electronic content available for purchase from the electronic content server 350 and/or the MVNO cloud 306 (step 502). As described above in connection with step 402, the information regarding the plurality of electronic content available for purchase can be displayed in a web browser of the wireless device 10 and/or can be displayed in an application that is stored on the wireless device 10. In some aspects, the information regarding the plurality of electronic content available for purchase can be forwarded in response to a request, such as a search string, from the user of the wireless device 10.

The user of the wireless device 10 can then select one or more of the electronic content for purchase and, in response, the wireless device 10 can forward an indication that the user of the wireless device 10 has selected to purchase electronic content (step 504). As described above in connection with step 404, the indication may include an identifier of the selected electronic content, an identifier of the user of the wireless device 10 from the user account module 310, a date and time that the user of the wireless device 10 selected the electronic content, an identifier of the wireless device 10, or the like. The electronic content server 350 or MVNO cloud 306 can identify the user of the wireless device 10, the wireless device 10, and/or the selected electronic content based on the information included in the indication received from the wireless device 10.

Next, the wireless device 10 forwards an MMS message with the payment information to the electronic content server 350 and/or the MVNO cloud 306 (step 506). As described above in connection with step 406, the MMS message may be encrypted. The payment information can include the current available balance of the user, an indication that the purchase price of the selected electronic content has been subtracted from the balance of the user, an identifier of the MVNO account associated with the user, and/or an identifier of an account associated with the user of the wireless device 10, such as a credit card number, a bank account number, a username of a virtual wallet, a username of an online payment transfer service, and/or the like.

In some aspects, the wireless device 10 may receive authorization information for the purchase of the selected electronic content from the electronic content server 350 and/or the MVNO cloud 306 (step 508). The wireless device 10 may be enabled to download the selected electronic content in response to reception of the authorization information. The authorization information can be included in another MMS message or in data received from the electronic content server 350 and/or the MVNO cloud 306.

The authorization information can include an authorization code, an indication of a payment confirmation, a summary of the purchase of the selected electronic content, the amount of money subtracted from the user's account, the remaining balance of the user's account, and/or the like. The wireless device 10 may then forward the authorization information to the electronic content server 350 to confirm purchase of the selected electronic content.

In other aspects, the wireless device 10 may not receive authorization information and can be enabled to download the selected electronic content by the electronic content server 350 forwarding the authorization information directly to the MVNO cloud 306 without the wireless device 10 as an intermediary.

Finally, the wireless device 10 can download the selected electronic content (step 510). The wireless device 10 can download the selected electronic content from the electronic content server 350 and/or the MVNO cloud 306. The selected electronic content can be downloaded immediately following purchase, or at a later time initiated by the user of the wireless device 10.

It is to be understood that the aspects of the disclosure are not limited to particular systems or processes described which may, of course, vary. It is also to be understood that the terminology used herein is for the purpose of describing particular aspects only, and is not intended to be limiting. As used in this specification, the singular forms "a," "an," and "the" include plural referents unless the content clearly indicates otherwise. Thus, for example, reference to "a memory" can include two or more memories.

Reference to "one aspect," "some aspects," "other aspects," or "one or more aspects" means that a particular feature, structure, or characteristic described in connection with the aspect is included in at least one aspect but not necessarily to the same aspect or a separate aspect that is mutually exclusive. Moreover, various features may be exhibited by some aspects and not by other aspects. Similarly, various requirements are described that may be requirements for some aspects but not other aspects.

A number of aspects have been described. Nevertheless, it will be understood that various modifications may be made without departing from the spirit and scope of the claims. For example, the wireless device 10 may not utilize a UICC or SIM card 22. The wireless device 10 may operate using any mobile operating system. The wireless device 10 may include internally stored rules of operation that may be changed together with other mobile communications devices within a select group via a broadcast message received from the MVNO cloud 306 or the MNO Network 302 or 304.

In another example, although the indication that the user of the wireless device 10 has selected to purchase the electronic content is described as being sent before the MMS message including the payment information, in some aspects, the indication that the user of the wireless device 10 has selected to purchase the electronic content can be included in the MMS message including the payment information. As such, both the indication that the user of the wireless device 10 has selected to purchase the electronic content and the payment information for the selected electronic content can be sent from the wireless device 10 to the electronic content server 350 and/or the MVNO cloud 306 in the same MMS message.

In yet another example, although the payment information has been described as being sent in an MMS message, in some aspects, the payment information can be sent from the wireless device 10 to the electronic content server 350 and/or the MVNO cloud 306 in an encrypted data packet.

Although for the sake of clarity and simplicity, exemplary aspects are described in terms of a wireless device 10 used in a MVNO communications system, it should be understood that the invention is not limited to these exemplary aspects.

The wireless device 10 can be a smartphone operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

Aspects of the invention can be web-based. For example, a server may operate a web application to allow the invention to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Further in accordance with various aspects of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices configured to implement the methods described herein.

It should also be noted that the software implementations of the invention as described herein can be stored on a tangible, non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and including art-recognized equivalents and successor media, in which the software implementations comprising code segments are stored.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the invention are apparent from the detailed specification, and, thus, it is intended by the appended claims to cover all such features and advantages of the invention which fall within the spirit and scope of the invention. Further, since numerous modifications and variations will readily occur to those skilled in the art, it is not desired to limit the invention to the exact construction and operation illustrated and described, and, accordingly, all suitable modifications and equivalents may fall within the scope of the invention.

What is claimed is:

1. A method for distributing electronic content to a wireless device, the method comprising:
   wirelessly connecting a wireless device to a wireless network over a wireless communication channel implemented by a mobile network operator;
   monitoring, via a mobile virtual network operator (MVNO) cloud, an amount of wireless services used by the wireless device;
   determining, via the wireless device, a wireless service account balance of wireless service;
   connecting the wireless device over the wireless network to an electronic content server, the electronic content server having a plurality of electronic content available for download;
   receiving in the electronic content server, from the wireless device over the wireless network, a selection indication from the wireless device of electronic content from among the plurality of electronic content available from the electronic content server that includes an identifier of selected electronic content in response to user interaction with the wireless device;
   identifying, in the electronic content server, a user of the wireless device based on information included in the selection indication;
   receiving in the electronic content server, forwarded from the wireless device, a multimedia messaging service message including the determined balance for obtaining the selected electronic content from the electronic content server;
   determining in the electronic content server whether the determined balance is greater than a purchase price of the selected electronic content;
   subtracting in the electronic content server the purchase price of the selected electronic content from the determined balance of wireless service of a user account stored in the electronic content server;
   determining, via at least one of the electronic content server or the MVNO cloud, authorization information based on the determination that the determined balance is greater than the purchase price, wherein the authorization information is included in a purchase confirmation transmitted to the wireless device for a purchase of the selected electronic content with the electronic content server, and wherein the purchase confirmation is configured to be displayed in a display of the wireless device by an application implemented by the wireless device;
   updating the wireless service account balance of wireless service with the electronic content server based on a cost of the selected electronic content; and
   downloading, from the electronic content server, the selected electronic content, to the wireless device in response to reception of the determined authorization information,
   wherein the authorization information is further determined based on user account identifier information comprising an identifier of the account associated with the user of the wireless device for the MVNO cloud; and
   wherein the wireless services comprise at least one of the following: voice communications, messaging, or data usage.

2. The method of claim 1, further comprising:
   providing activation and metering of the wireless service to the wireless device from the MVNO cloud for access to the wireless network implemented by the mobile network operator; and
   forwarding, from the electronic content server to the wireless device, information regarding the plurality of electronic content available over the wireless network, wherein the information regarding the plurality of electronic content available is configured to be displayed in a display of the wireless device by an application implemented by the wireless device.

3. The method of claim 2,
   wherein the electronic content server forwards the information regarding the plurality of electronic content available to the wireless device in response to receiving a request from the wireless device in response to user interaction with the wireless device;
   wherein the multimedia messaging service message is encrypted by the wireless device; and
   wherein the electronic content server is implemented in the MVNO cloud;
   wherein the MVNO cloud comprises a server; and
   wherein the MVNO cloud is configured to communicate with the
mobile network operator.

4. The method of claim 3, further comprising decrypting the encrypted multimedia messaging service message by the MVNO cloud to extract the user account identifier information for the purchase of the selected electronic content.

5. The method of claim 1, further comprising:
   forwarding, from the electronic content server to the wireless device,
   information regarding the plurality of electronic content available over the wireless network,
   wherein the information regarding the plurality of electronic content available is configured to be displayed in a display of the wireless device by an application implemented by the wireless device.

6. The method of claim 5, further comprising:
   providing activation and metering of the wireless service to the wireless device from the MVNO cloud for access to the wireless network implemented by the mobile network operator;
   encrypting the multimedia messaging service message by the wireless device; and
   decrypting the encrypted multimedia messaging service message by the MVNO cloud to extract the user account identifier information for the purchase of the selected electronic content,
   wherein the electronic content server is implemented in the MVNO cloud;
   wherein the MVNO cloud comprises a server; and
   wherein the MVNO cloud is configured to communicate with the mobile network operator.

7. The method of claim 6, further comprising determining with the electronic content server whether the user of the wireless device is authorized to purchase the selected electronic content.

8. The method of claim 1, further comprising forwarding a multimedia messaging service message from the electronic content server that comprises the determined authorization information to the wireless device.

9. The method of claim 1, further comprising:
   sending from the electronic content server a remaining account balance of the wireless service to the wireless device.

10. The method of claim 1, further comprising:
    enabling the electronic content server to forward the selected electronic content to the wireless device over the wireless network; and
    forwarding, from the electronic content server to the wireless device, information regarding the plurality of electronic content available over the wireless network,
    wherein the information regarding the plurality of electronic content available is configured to be displayed in a display of the wireless device by an application implemented by the wireless device.

11. The method of claim 1, further comprising:
    providing activation and metering of the wireless service to the wireless device from the MVNO cloud for access to the wireless network implemented by the mobile network operator;
    forwarding, from the electronic content server to the wireless device, information regarding the plurality of electronic content available over the wireless network;
    encrypting the multimedia messaging service message by the wireless device;
    decrypting the encrypted multimedia messaging service message by the MVNO cloud to extract the user account identifier information for the purchase of the selected electronic content;
    determining with the electronic content server whether the user of the wireless device is authorized to purchase the selected electronic content;
    sending a remaining balance of the account to the wireless device;
    forwarding a multimedia messaging service message from the electronic content server that comprises authorization information to the wireless device; and
    enabling the electronic content server to forward the selected electronic content to the wireless device over the wireless network,
    wherein the electronic content server is implemented in the MVNO cloud.

12. A method for distributing electronic content to a wireless device, the method comprising:
    wirelessly connecting a wireless device to a wireless network over a wireless communication channel implemented by a mobile network operator;
    monitoring, via an MVNO cloud, an amount of wireless services used by the wireless device;
    determining, via the wireless device, a wireless service account balance of wireless service;
    connecting the wireless device over the wireless network to an electronic content server, the electronic content server having a plurality of electronic content available for download;
    transmitting to the wireless device from the electronic content server over the wireless network, information regarding the plurality of electronic content available from the electronic content server;
    receiving over a wireless network to the electronic content server, from the wireless device, a selection indication of electronic content from among the plurality of electronic content available from the electronic content server that includes an identifier of the selected electronic content in response to user interaction with the wireless device;
    identifying in the electronic content server a user of the wireless device based on information included in the selection indication;
    receiving over a wireless network to the electronic content server, forwarded from the wireless device, a multimedia messaging service message including the determined balance to obtain the selected electronic content;
    determining in the electronic content server whether the determined balance is greater than a purchase price of the selected electronic content;
    subtracting in the electronic content server the purchase price of the selected electronic content from the determined balance of wireless service of a user account stored in the electronic content server;
    determining, via at least one of the electronic content server or the MVNO cloud, authorization information based on the determination that the determined balance is greater than the purchase price, wherein the authorization information is included in a purchase confirmation transmitted to the wireless device for a purchase of the selected electronic content with the electronic content server, and wherein the purchase confirmation is configured to be displayed in a display of the wireless device by an application implemented by the wireless device;
    updating the wireless service account balance of wireless service with the electronic content server based on a cost of the selected electronic content; and
    downloading, over the wireless network from the electronic content server, the selected electronic content, in response to reception of the determined authorization information,
    wherein the authorization information is further determined based on user account identifier information comprising an identifier of the account associated with the user of the wireless device for the MVNO cloud; and wherein the wireless services comprise at least one of the following: voice communications, messaging, or data usage.

13. The method of claim 12, further comprising:
maintaining the wireless service account associated with the wireless device by the
MVNO cloud, wherein the MVNO cloud comprises a server; and
wherein the MVNO cloud is configured to communicate with the mobile network operator.

14. The method of claim 12, further comprising:
providing activation and metering of the wireless service to the wireless device from the MVNO cloud for access to the wireless network implemented by the mobile network operator;
encrypting the multimedia messaging service message by the wireless device; and
decrypting the encrypted multimedia messaging service message by the MVNO cloud to extract the user account identifier information for the purchase of the selected electronic content,
wherein the electronic content server is implemented in the MVNO cloud; and
wherein the information regarding the plurality of electronic content available is configured to be displayed in a display of the wireless device by an application implemented by the wireless device.

15. The method of claim 14, further comprising
providing activation and metering of the wireless service to the wireless device from the MVNO cloud for access to the wireless network implemented by the mobile network operator;
forwarding, from the electronic content server to the wireless device, information regarding the plurality of electronic content available over the wireless network;
encrypting the multimedia messaging service message by the wireless device; and
decrypting the encrypted multimedia messaging service message by the MVNO cloud to extract the user account identifier information for the purchase of the selected electronic content.

16. The method of claim 12, further comprising a determination, by the electronic content server, whether the user of the wireless device is authorized to purchase the selected electronic content.

17. The method of claim 12, further comprising receiving in the wireless device a multimedia messaging service message including authorization information generated by the electronic content server.

18. The method of claim 12, further comprising:
providing activation and metering of the wireless service to the wireless device from the MVNO cloud for access to the wireless network implemented by the mobile network operator;
forwarding, from the electronic content server to the wireless device, information regarding the plurality of electronic content available over the wireless network;
decrypting the encrypted multimedia messaging service message by the MVNO cloud to extract the user account identifier information for the purchase of the selected electronic content;
determining with the electronic content server whether the user of the wireless device is authorized to purchase the selected electronic content;
sending a remaining balance of the account to the wireless device;

forwarding a multimedia messaging service message from the electronic content server that comprises authorization information to the wireless device; and
enabling the electronic content server to forward the selected electronic content to the wireless device over the wireless network,
wherein the electronic content server is implemented in a mobile virtual network operator cloud.

19. A method for distributing electronic content to a wireless device, the method comprising:
wirelessly connecting a wireless device to a wireless network over a wireless communication channel of a mobile network operator implementing the wireless network;
monitoring, via an MVNO cloud, an amount of wireless services used by the wireless device;
determining, via the wireless device, a wireless service account balance of wireless service;
connecting the wireless device over the wireless network to an electronic content server, the electronic content server having a plurality of electronic content available for download;
transmitting to the wireless device from the electronic content server over the wireless network, information regarding the plurality of electronic content available from the electronic content server,
receiving over a wireless network to the electronic content server, from the wireless device, a selection indication of electronic content from among the plurality of electronic content available from the electronic content server that includes an identifier of the selected electronic content in response to user interaction with the wireless device;
identifying in the electronic content server a user of the wireless device based on information included in the selection indication;
receiving over a wireless network to the electronic content server, forwarded from the wireless device, a multimedia messaging service message including the determined balance to obtain the selected electronic content;
determining in the electronic content server whether the determined balance is greater than a purchase price of the selected electronic content;
subtracting in the electronic content server the purchase price of the selected electronic content from the determined balance of wireless service of a user account stored in the electronic content server,
determining, via at least one of the electronic content server or the MVNO cloud, authorization information based on the determination that the determined balance is greater than the purchase price, wherein the authorization is included in a purchase confirmation transmitted to the wireless device for a purchase of the selected electronic content with the electronic content server, and wherein the purchase confirmation is configured to be displayed in a display of the wireless device by an application implemented by the wireless device;
updating the wireless service account balance of wireless service with the electronic content server based on a cost of the selected electronic content; and
downloading, over the wireless network from the electronic content server, the selected electronic content, in response to reception of the determined authorization information,
wherein the authorization information is further determined based on user account identifier information comprising an identifier of the account associated with the user of the wireless device for the MVNO cloud;

wherein the wireless services comprise at least one of the following: voice communications, messaging, or data usage;

wherein the multimedia messaging service message is encrypted by the wireless device; and wherein the electronic content server is implemented in a mobile virtual network operator cloud.

20. The method of claim 19, further comprising:

providing activation and metering of the wireless service to the wireless device from the MVNO cloud for access to the wireless network implemented by the mobile network operator;

forwarding, from the electronic content server to the wireless device, information regarding the plurality of electronic content available over the wireless network;

decrypting the encrypted multimedia messaging service message by the MVNO cloud to extract the user account identifier information for the purchase of the selected electronic content;

determining with the electronic content server whether the user of the wireless device is authorized to purchase the selected electronic content;

sending a remaining balance of the account to the wireless device;

forwarding a multimedia messaging service message from the electronic content server that comprises authorization information to the wireless device; and enabling the electronic content server to forward the selected electronic content to the wireless device over the wireless network, wherein the electronic content server is implemented in the MVNO cloud.

* * * * *